US008285036B2

(12) United States Patent
Hiramatsu

(10) Patent No.: US 8,285,036 B2
(45) Date of Patent: Oct. 9, 2012

(54) IMAGE PROCESSING METHOD, IMAGE PROCESSING APPARATUS, AND COMPUTER-READABLE STORAGE MEDIUM FOR COMPUTER PROGRAM

(75) Inventor: Naoko Hiramatsu, Kyoto (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 172 days.

(21) Appl. No.: 12/884,632

(22) Filed: Sep. 17, 2010

(65) Prior Publication Data
US 2011/0069882 A1 Mar. 24, 2011

(30) Foreign Application Priority Data
Sep. 18, 2009 (JP) ................. 2009-218127

(51) Int. Cl.
G06K 9/00 (2006.01)

(52) U.S. Cl. ........ 382/165; 382/167; 382/199; 345/590; 345/591; 345/593; 345/603; 348/663; 358/515; 358/518; 358/509

(58) Field of Classification Search ........................ None
See application file for complete search history.

(56) References Cited

U.S. PATENT DOCUMENTS

| 5,119,185 | A  | * | 6/1992 | Ikeda et al. ................... 358/500 |
| 6,480,624 | B1 | * | 11/2002 | Horie et al. ................... 382/165 |
| 6,665,439 | B1 |   | 12/2003 | Takahashi |
| 7,474,342 | B2 |   | 1/2009 | Kohashi et al. |
| 2001/0012397 | A1 | * | 8/2001 | Kato ................... 382/166 |
| 2001/0016064 | A1 | * | 8/2001 | Tsuruoka et al. ............. 382/167 |
| 2008/0292204 | A1 | * | 11/2008 | Itoh ................... 382/266 |

FOREIGN PATENT DOCUMENTS

| JP | 2-294884 | 12/1990 |
| JP | 6-113130 | 4/1994 |
| JP | 6-333045 | 12/1994 |
| JP | 11-110550 | 4/1999 |
| JP | 2000-293696 | 10/2000 |
| JP | 2001-128186 | 5/2001 |
| JP | 2004-030007 | 1/2004 |
| JP | 2009-005331 | 1/2009 |

OTHER PUBLICATIONS

Decision to Grant a Patent dated Sep. 27, 2011, for corresponding Japanese patent application No. 2009-218127 and its English translation, 8 pgs.
Japanese Office Action dated Jul. 26, 2011, for corresponding Japanese patent application No. 2009-218127 and its English translation, 7 pgs.

* cited by examiner

Primary Examiner — John Lee
(74) Attorney, Agent, or Firm — Morrison & Foerster LLP

(57) ABSTRACT

A method is provided for extracting an edge included in a color image formed of first pixels expressed by color component values of three colors. The method includes: calculating a lightness value of the first pixel based on the color component values; determining which one of the low, medium, and high lightness regions, the calculate lightness value belongs to; generating an extraction image formed of second pixels corresponding to the first pixels; and extracting an edge based on the pixel value of the extraction image thus generated. For a first pixel whose lightness value belongs to the medium lightness region and the low or high lightness region, a pixel value is calculated from the color component values of three colors, and from the color component values excluding at least one color, respectively. Then, the edge is extracted based on the calculated pixel value of the extraction image.

10 Claims, 10 Drawing Sheets

IMAGE PROCESSING METHOD, IMAGE PROCESSING APPARATUS, AND COMPUTER-READABLE STORAGE MEDIUM FOR COMPUTER PROGRAM

This application is based on Japanese Patent Application No. 2009-218127 filed on Sep. 18, 2009, the contents of which are hereby incorporated by reference.

BACKGROUND OF THE INVENTION

1. Field of the Invention

The present invention relates to an image processing method, an image processing apparatus, and a computer-readable storage medium for a computer program for extracting edges included in a color image.

2. Description of the Related Art

Edge extraction, or sometimes called "contour extraction", for extracting edges in an image is known as one of image processing ways for modifying or editing images. The edge discussed here is a line element that characterizes shape information of an image, and is a border between neighboring regions having prominent differences in density or color from each other. For example, an outer edge of a character or a drawing in a business document corresponds to the edge. The processing result from edge extraction is used in image quality control for enhancing the edge, or image editing for moving a region enclosed by edges or changing colors of the region.

A method for converting a color image into a gray scale image is common as a method for extracting edges included in a color image. In this method, lightness is focused among three properties expressing colors (lightness, hue, and saturation), and a border between regions having different lightness is extracted as an edge. However, an edge that is formed between colors having lightness close to each other, such as white and yellow, or black and blue, can not be extracted.

In view of this, methods for extracting edges using information other than the lightness have been conceived. Among these is a method for determining a text region based on a minimum value signal among color signals of RGB (JP-02-294884A). According to this method, it is possible to extract a contour of a highly saturated color that is adjacent to a white background. However, it is impossible to extract an edge between a highly saturated color and black. According to another method, an edge extraction is performed for each of the color components R, G, and B (JP-06-113130). In this method, it is possible to extract an edge that is formed between color combinations having a difference in any of the R, G, and B components. However, it takes a long time to perform the processing sequentially for R, G, and B, whereas parallel processing requires circuitry of an appropriate size to cope with such processing.

Additionally, there is proposed another method to use the lightness and other information. This method discloses a way to extract an edge using fuzzy inference in which priority is given to the lightness where the saturation is low, but the priority is given to the hue where the saturation is high (JP-06-333045A). According to this method, a user is required to perform instruction operation by tracing edges of a sample image for automatically generating fuzzy inference rules.

SUMMARY OF THE INVENTION

In view of the problems describe above, it is an object of the present invention to provide a method and an apparatus for effectively extracting edges included in a color image.

According to an aspect of the present invention, an image processing method for extracting an edge included in a color image comprising first pixels each of which expressed by color component values of three colors, comprises: dividing a predetermined lightness range into three to define a low lightness region, a medium lightness region, and a high lightness region; calculating a lightness value of each of the first pixels based on the color component values of three colors corresponding to said each of the first pixels; determining which one of the low, medium, and high lightness regions the lightness value thus calculated belongs to; generating an extraction image comprising second pixels each of which corresponding to said each of the first pixels, wherein, for a given first pixel of which the lightness value belongs to the medium lightness region, a pixel value of a second pixel corresponding to said given first pixel is calculated from the color component values of three colors of said given first pixel, and wherein, for a given first pixel of which the lightness value belongs to the low or high lightness region, a pixel value of a second pixel corresponding to said given first pixel is calculated from the color component values of said given first pixel excluding at least one of the three colors; and extracting an edge from the extraction image based on the pixel value of the second pixel of the extraction image thus generated.

These and other characteristics and objects of the present invention will become more apparent by the following descriptions of preferred embodiments with reference to drawings.

DESCRIPTION OF THE PREFERRED EMBODIMENTS

Figure 1:
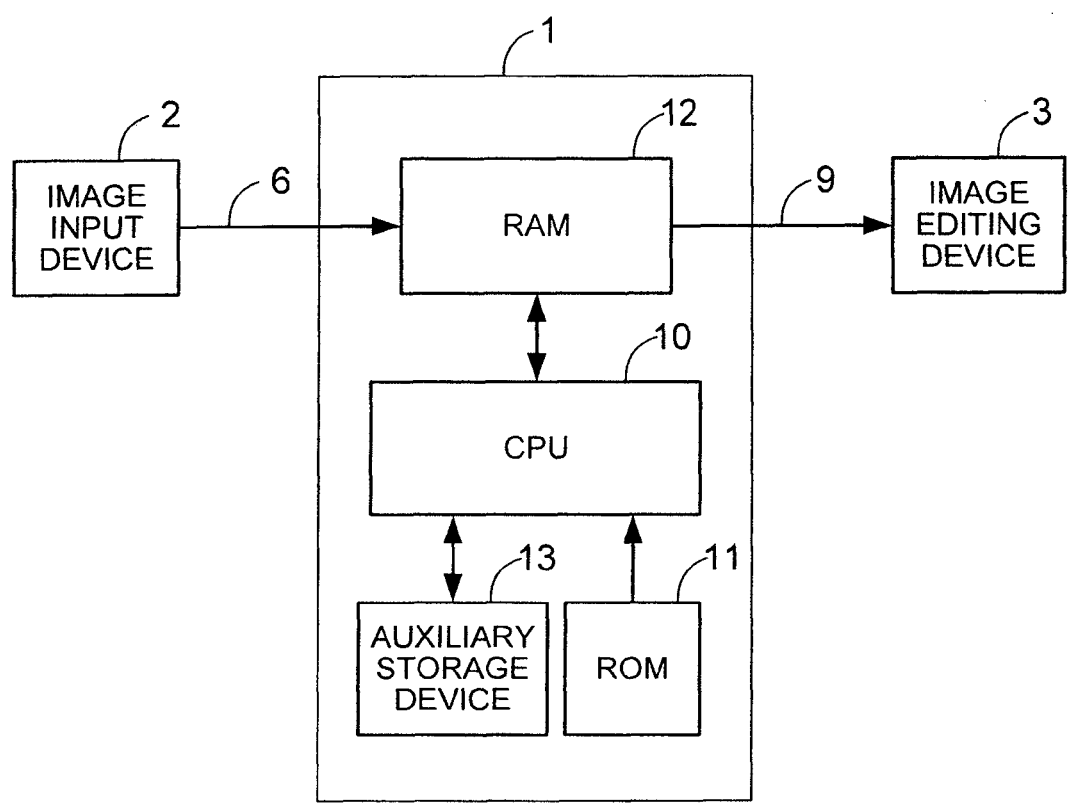
FIG. 1 is a diagram illustrating a hardware configuration of an image processing apparatus according to the embodiments of the present invention.

It is assumed that an image processing apparatus achieves image processing for extracting edges included in a color image by software. An image processing apparatus 1 illustrated in FIG. 1 is provided with a Central Processing Unit (CPU) 10 serving as a computer that executes programs. The CPU 10 loads a program stored in a Read-Only Memory (ROM) 11 into a Random Access Memory (RAM) 12 serving as a work area, and executes the loaded program. When the program is executed, the CPU 10 uses, as necessary, an auxiliary storage device 13 for storing data. For example, a Hard Disk Drive (HDD) is used as the auxiliary storage device 13. A color image 6 which is digitized and a target to be processed is fed from an image input device 2 into the image processing apparatus 1. Then, an edge image 9 as edge information resulted from the extraction is transmitted to an image editing device 3.

The image input device 2 may be any one of a color image scanner, a digital camera, an information processing device represented by a personal computer, and other equipment that outputs color image data. It is also possible to incorporate the image processing device 1 into such equipment as a scanner or camera. In such a case, the image input device 2 serves as equipment incorporating the processing device 1 therein.

The image editing device 3 includes an image editing function for processing the color image 6 based on the edge image 9 fed out from the image input device 2. For example, if the color image 6 includes text information, processing according to the Universal Design is applied so that different colors are arranged in text portions indicated in the edge image 9 and in the peripheries thereof for improved legibility. The image editing apparatus 3 prints, displays, or transmits to another device the color image that has been subjected to the processing.

Figure 2:
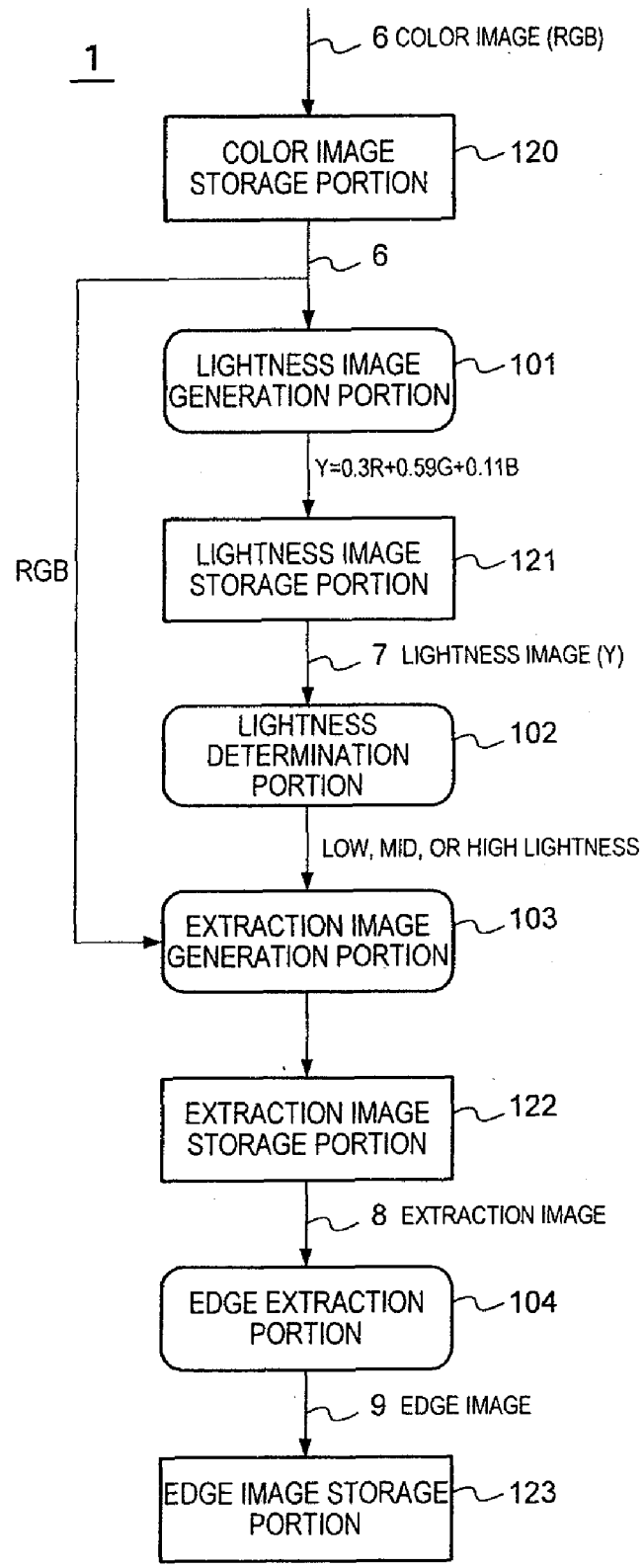
FIG. 2 is a diagram illustrating a functional configuration of an image processing apparatus according to a first embodiment.

As illustrated in FIG. 2, the image processing apparatus 1 includes a plurality of functional elements. A storage area of the RAM 12 serves as a color image storage portion 120, a lightness image storage portion 121, an extraction image storage portion 122, and an edge image storage portion 123. A lightness image generation portion 101, a lightness determination portion 102, an extraction image generation portion 103, and an edge extraction portion 104 are implemented when the CPU 10 executes individual programs corresponding thereto.

The color image storage portion 120 stores the color image 6 inputted to the image processing device 1. The color image 6 is a set of pixels each of which is represented by values of three color components of Red, Green, and Blue (R, G, and B). The pixel value of each pixel of the color image 6 is referred to by the lightness image generation portion 101 and the extraction image generation portion 103.

The lightness image generation portion 101 calculates lightness of each pixel of the color image 6 based on the values of three color components corresponding to the pixel. For example, an equation "Y (lightness)=0.3R+0.59G+0.11B" which is commonly used in processing gray scales is used to calculate the lightness. The lightness values thus calculated for all the pixels of the color image 6 are stored in the lightness image storage portion 121 as a lightness image 7.

The lightness determination portion 102 refers to the lightness image 7 and determines which one of low, medium, and high lightness regions the lightness value of each pixel of the color image 6 corresponds to. The low, medium, and high lightness regions respectively correspond to three segments when the lightness range is divided into three. In this embodiment, the lightness range corresponds to a range of value expressed in 8 bits, i.e., from "0" to "255". The low lightness region is a segmented range from the minimum value of 0 to a threshold A, e.g., 80; the medium lightness region is a segmented range from a value larger than the threshold A to a value smaller than a threshold B, e.g., 180; and the high lightness region is a segmented range from the threshold B to a maximum value of 255.

The extraction image generation portion 103 utilizes the determination result by the lightness determination portion 102 and generates the extraction image 8 having pixels corresponding to individual pixels of the color image 6. When the extraction image 8 is generated, for a pixel whose lightness value falls under the medium lightness region, a pixel value thereof is calculated from the values of three color components; and for a pixel whose lightness value falls under the low or high lightness region, a pixel value thereof is calculated from the values of color component excluding at least one color component. To be specific, for a pixel whose lightness value falls under the medium lightness region, difference values between values of color components of R and B, G and B, and R and G are individually obtained. Then, the largest value among these difference values thus obtained is assigned to a pixel value of a pixel of the extraction image 8. For a pixel whose lightness value falls under the low or high lightness region, a difference value between values of color components R and G is assigned to a pixel value of a pixel of the extraction image 8. Here, the difference value is an absolute value of a difference between the values of two color components. For convenience sake, the values of three color components are individually named "R", "G", and "B", and the difference values are individually expressed as |R−B|, |G−B|, and |R−G|. It is also possible to assign a value of color component B itself as a pixel value of the extraction image 8 for a pixel whose lightness value falls under the low lightness region and assign a difference value |Y−B| between a lightness value (Y) and a value of color component B. The extraction image 8 whose pixel values are determined as described above is then stored in the extraction image storage portion 122.

The edge extraction portion 104 extracts an edge which is a border between areas having different color tones based on the pixel values of the extraction image 8. For the edge extraction, it is possible to use a known method performing a local multiplicative summation by applying a predetermined filter. Filters such as Sobel filter, Roberts filter, Prewitt filter, or 4- or 8-neighbor Laplacian filter may be applied. An edge image 9 indicating whether individual pixels of the extraction image 8 correspond to an edge is generated by the edge extraction portion 104. Since the pixels of the extraction image 8 individually correspond to the pixels of the color image 6, the edge image 9 may be interpreted as information indicating positions of edges in the color image 6.

Figure 3A:
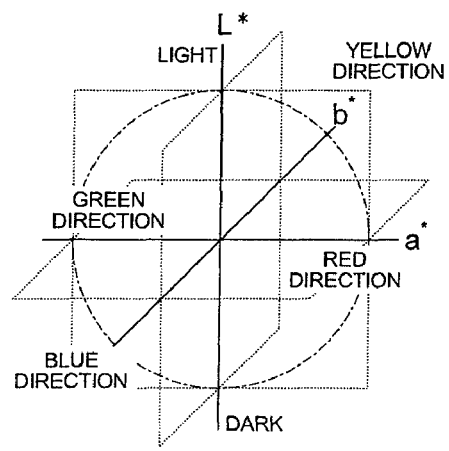
FIGS. 3A to 3D are diagrams illustrating color reproductive regions in outputting a color image.
Figure 3B:
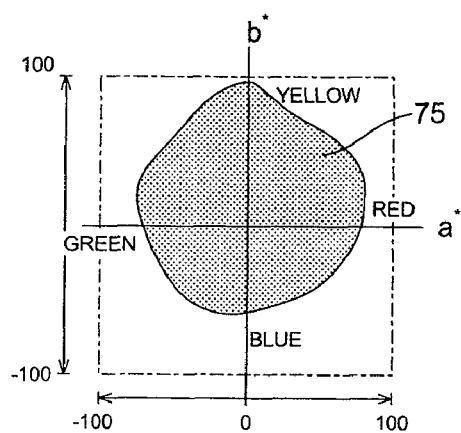
Figure 3C:
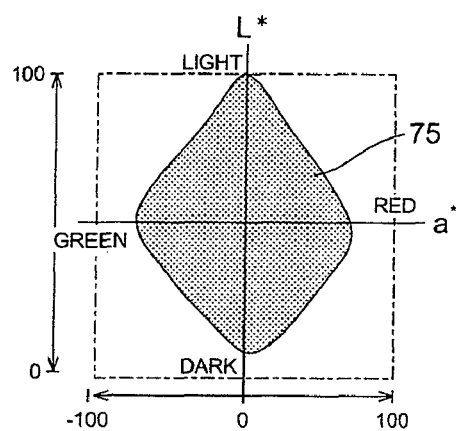
Figure 3D:
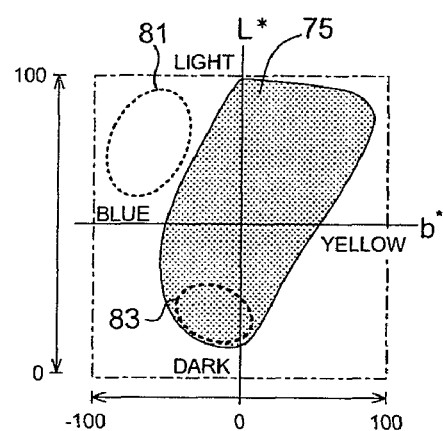

Next, referring to FIGS. 3A to 3D, a description will be given of the reason why the lightness is determined in extracting edges by the image processing apparatus 1. FIG. 3A illustrates an L*a*b* color space, and FIGS. 3B to 3D illustrate cross-sectional shapes of an a*b* plane, an L*b* plane, and an L*b* plane of a color reproductive region 75 which is actually three-dimensional, respectively. The color reproductive region 75 in the example represents colors that can be reproduced in color printing by electrophotographic process. It should be noted, however, that tendencies similar to those described below can also be found in color printing by other processes and in color displaying by various types of display units.

What should be noted here is the shape of the color representative region 75 in FIG. 3D. In FIGS. 3B and 3C, the color reproductive region 75 spreads out substantially in a uniform manner to four directions while making a crossing point of the two axes as a center of the space. In contrast, in FIG. 3D, the color reproductive region 75 spreads out less toward left-upper and right-lower directions but more toward right-upper and left-lower directions. This indicates that blue that is lighter and has a high level of saturation corresponding to a region 81 enclosed by a broken line is not reproduced, but dark blue that can be reproduced and corresponds to a region 83 has a high level of saturation.

For this reason, it is possible to roughly determine a color of a pixel if a value of color component B among R, G, and B is focused for a pixel having lightness corresponding to the high lightness or low lightness region. It is possible to obtain a good result in the color determination based only on the value of color component B, particularly in the low lightness region. To improve the accuracy of the determination, however, it is preferable that the value of color component B and, at the same time, other information (a value of another color component or lightness value) be referred to. According to an experiment, a better result is obtained in the case where the values of color components B and R are focused than the case where the values of color components B and G are focused.

Figure 4:
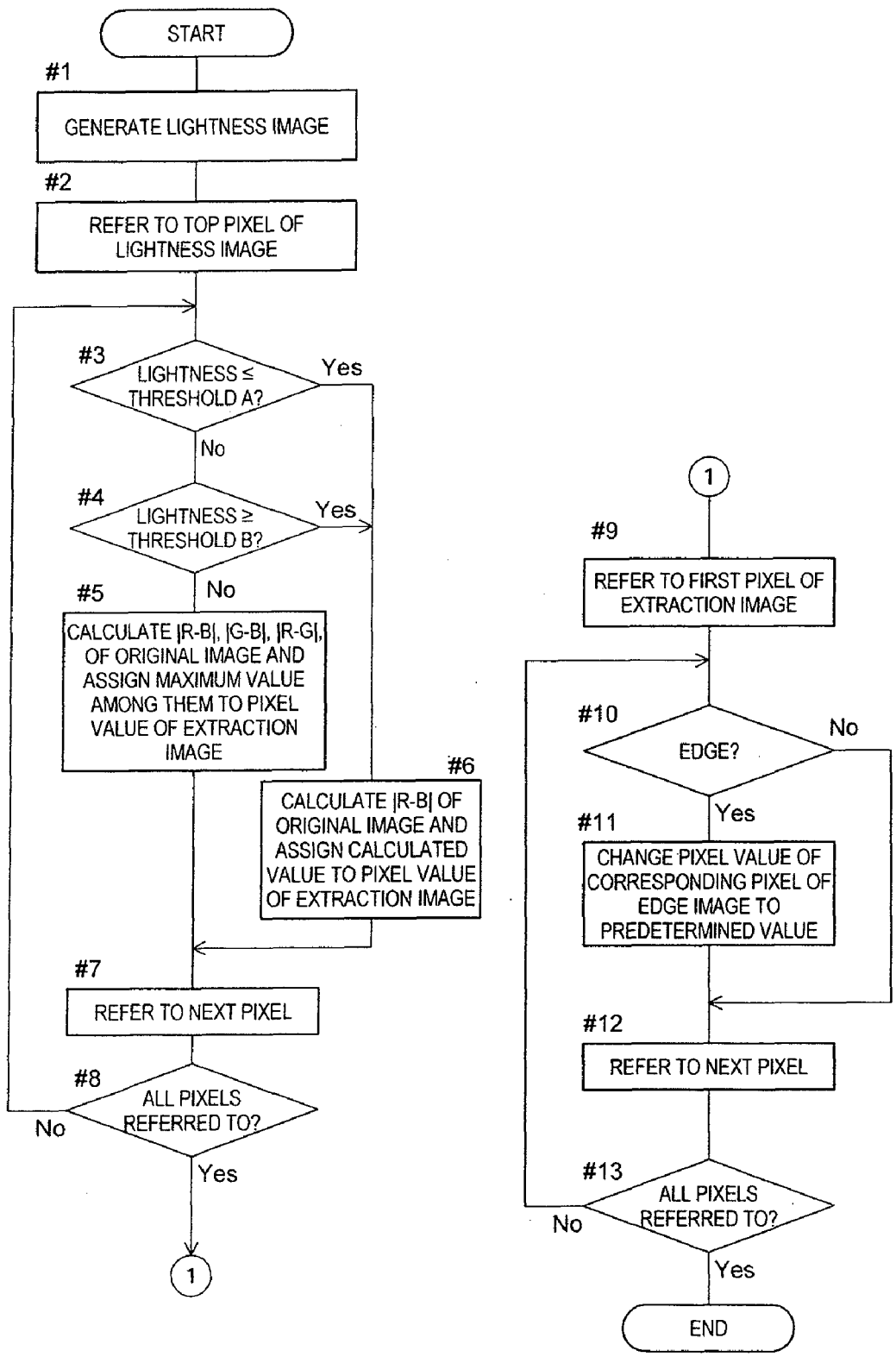
FIG. 4 is a flowchart illustrating the operation of the image processing apparatus according to the first embodiment.

FIG. 4 illustrates outlined operation of the image processing apparatus 1.

The lightness image generation portion 101 of the image processing apparatus 1 generates the lightness image 7 (#1). The lightness determination portion 102 determines the lightness value of each pixel starting sequentially from a first pixel of the lightness image 7 (#2, #3, #4, #7, and #8). If the lightness value is equal to or smaller than the threshold value A, i.e., a value corresponding to the low lightness region, the extraction image generation portion 103 obtains a difference value |R−B| between the values of color components R and B of a corresponding pixel of the color image 6 which is the original image, and assigns the value thus obtained as a pixel value of the corresponding pixel of the extraction image 8 (#3 and #6). If the lightness value is equal to or larger than the threshold value B, i.e., a value corresponding to the high lightness region, the extraction image generation portion 103 also assigns a difference value |R−B| between the values of color components R and B as a pixel value of a corresponding pixel of the extraction image 8 (#4 and #6). If the lightness value is neither equal to or smaller than the threshold A nor equal to or larger than the threshold B, i.e., if the lightness value is a value corresponding to the medium lightness region, the extraction image generation portion 103 obtains difference values |R−B|, |G−B|, and |R−G| between values of color components R and G, G and B, and R and B, respectively, and assigns the maximum value among these difference values thus obtained as a pixel value of a pixel of the extraction image 8. The generation of the extraction image 8 is completed when all of the pixels of the lightness image 7 are processed by the lightness determination portion 102 and the extraction image generation portion 103 (#7 and #8).

The edge extraction portion 104 generates the edge image 9 based on the extraction image 8. The edge extraction portion 104 checks individual pixels of the extraction image 8 sequentially from a first pixel of the extraction image 8 and determines whether each pixel corresponds to an edge (#9 and #10). If a target pixel of the extraction image 8 corresponds to the edge, the edge extraction portion 104 replaces an initial pixel value of the corresponding pixel of the edge image 9 with a predetermined value representing an edge (#11). The generation of the edge image 9, i.e., edge extraction, is completed when all of the pixels of the extraction image 8 are processed by the edge extraction portion 104 (#12 and #13).

It should be noted that, in the process of step #6 which is performed if the pixel of the lightness image 7 is in the low or high lightness region, it is also possible to obtain a difference value |G−B| between the values of color components G and B instead of the difference value |R−B| and assign as a pixel value of a corresponding pixel of the extraction image 8.

Figure 5:
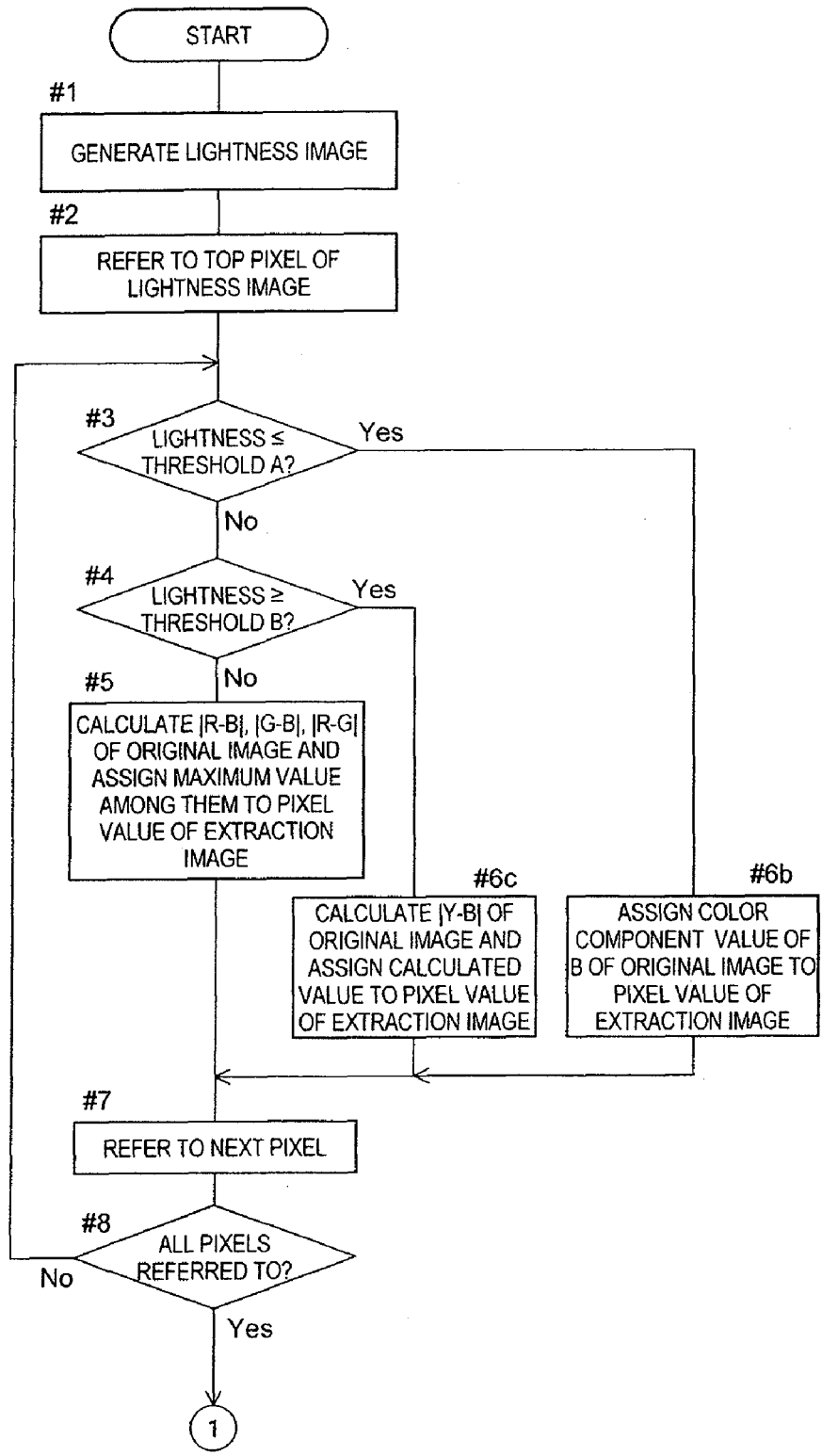
FIG. 5 is a flowchart illustrating the modified operation of the image processing apparatus according to the first embodiment.

In the example illustrated in FIG. 4, when the pixel value of the extraction image is determined (#5 and #6), the same step (#6) is performed for both the low and high lightness regions. Alternatively, it is also possible, as illustrated in FIG. 5, to perform different steps for the low and high lightness regions, respectively. In the example illustrated in FIG. 5, if the lightness value of a pixel of the color image 6 which is the original image falls under the low lightness region, a value of color component B is assigned as a pixel value of a corresponding pixel of the extraction image 8 (#6*b*). If the lightness value is a value in the high lightness region, a difference value |Y−B| between the lightness value and a value of color component B is assigned as a pixel value of a corresponding pixel of the extraction image 8 (#6*c*). In FIG. 5, steps #9-#13 illustrated in FIG. 4 are omitted.

Hereinafter, a description will be given of another configuration example of the image processing apparatus. In the illustrations referred to hereinafter, elements corresponding to those already described with reference to the foregoing illustrations will be identified with the identical symbols.

Figure 6:
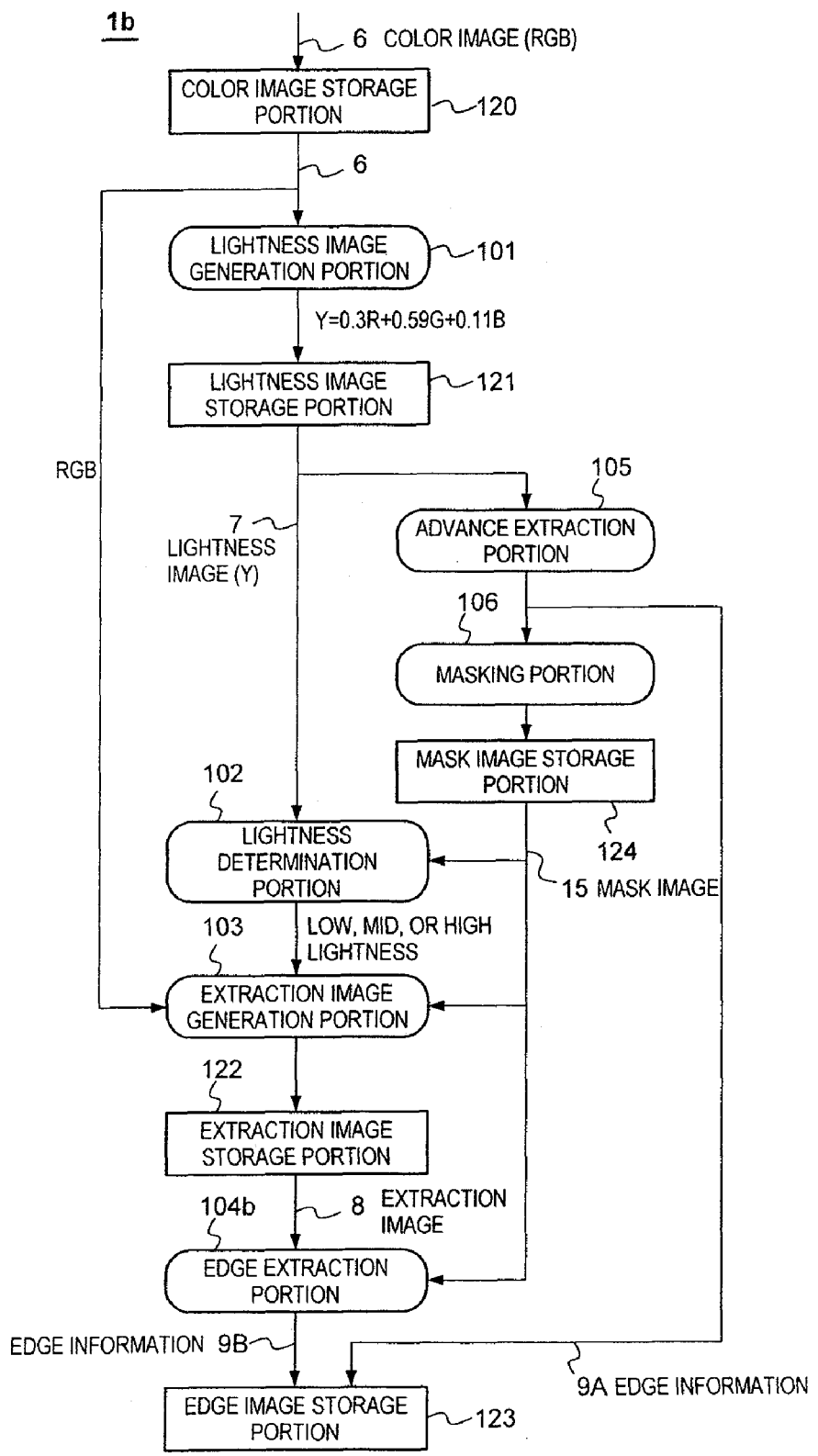
FIG. 6 is a diagram illustrating a functional configuration of an image processing apparatus according to a second embodiment.

An image processing apparatus 1*b* exemplified in FIG. 6 performs edge extraction from the lightness image 7 prior to the edge extraction from the extraction image 8, and reflects the result thus obtained in edge extraction from the extraction image 8. To achieve such characteristic operation, the image processing apparatus 1*b* is provided with three functional elements in addition to the functional elements similar to those provided in the image processing apparatus 1 described previously and illustrated in FIG. 2. These three functional elements include an advance extraction portion 105, a masking portion 106, and a mask image storage portion 124. The advance extraction portion 105 and the masking portion 106 are implemented when the CPU 10 executes individual programs corresponding thereto. A storage area of the RAM 12 serves as the mask image storage portion 124.

The advance extraction portion 105 extracts an edge which is a border between regions having different lightness based on the pixel values of the lightness image 7 stored in the lightness image storage portion 121. Edge information 9A representing pixels corresponding to the extracted edges is incorporated in the edge image 9 and stored in the edge image storage portion 123. The edge information 9A is delivered to the masking portion 106.

The masking portion 106 generates a mask image 15 indicating a portion, in the extraction image 8, from which edge extraction is unnecessary. First, the masking portion 106 resets all pixels of the mask image 15 to null. Thereafter, the masking portion 106 set a region in the mask image 105 corresponding to an edge already extracted by the advance extraction portion 105 as a mask region from which edge extraction is not performed. This means that the pixel values of the pixels of the mask region are changed from null to the maximum value. The mask image 15 in which the mask region has been thus set is stored in the mask image storage portion 124.

In the image processing apparatus 1*b*, an edge extraction portion 104*b* refers to the mask image 15 and extracts edges from a region, in the extraction image 8, other than a region corresponding to the mask region of the mask image 15. The more the number of pixels corresponding to the mask region increases, the less amount of time is required by the edge extraction portion 104*b* to complete extraction. Edge information 9B which is a result of extraction by the edge extraction portion 104*b* is incorporated in the edge image 9 and stored in the edge image storage portion 123. The edge image 9 generated in the image processing apparatus 1*b* is formed of the edge information 9A based on the lightness image 7 and the edge information 9B based on the extraction image 8.

Figure 7:
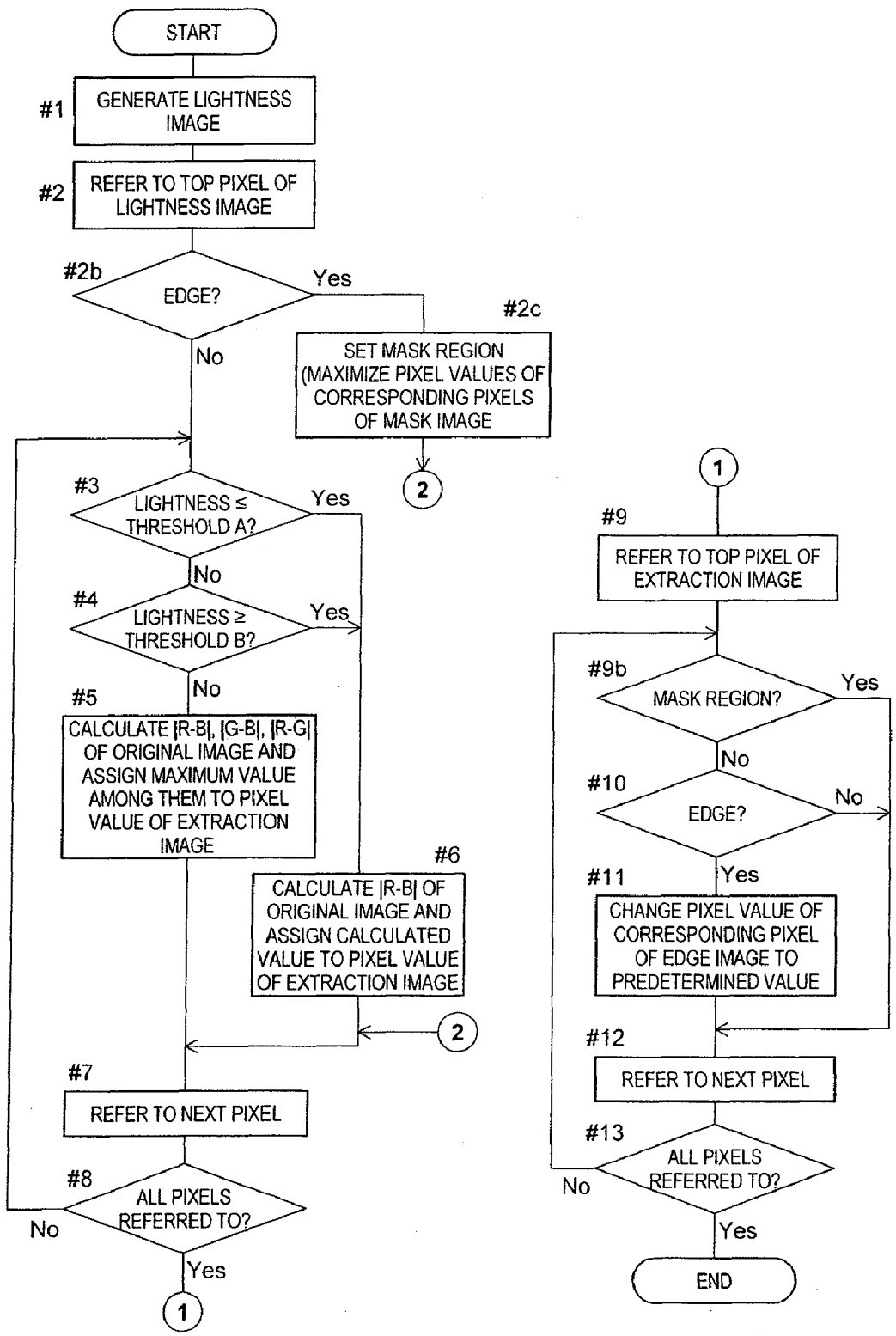
FIG. 7 is a flowchart illustrating the operation of the image processing apparatus according to the second embodiment.

FIG. 7 illustrates outlined operation of the image processing apparatus 1b.

The lightness image generation portions 101 generates the lightness image 7 (#1), and the advance extraction portion 105 checks each pixel of the lightness image 7 sequentially from a first pixel and determines whether the pixel corresponds to an edge (#2 and #2b). For the pixels that correspond to the edge, the masking portion 106 sets the pixel values of corresponding pixels of the mask image 15 to the maximum value of "255" which serves as a masking value. The lightness determination portion 102 and the extraction image generation portion 103 perform processing in a similar manner as described previously (#3-#8) to thereby generate the extraction image 8.

The edge extraction portion 104b generates the edge image 9 based on the extraction image 8. The edge extraction portion 104b sequentially checks each pixel of the extraction image 8 from a first pixel and determines whether or not the pixel corresponds to the mask region based on a pixel value of a pixel corresponding to the mask image 15 (#9 and #9b), and determines whether or not a pixel corresponds to an edge only for those pixels that do not correspond to the mask region (#10). If a target pixel of the extraction image 8 corresponds to an edge, the edge extraction portion 104b changes a pixel value of the corresponding pixel of the edge image 9 from an initial value to a predetermined value that indicates a value corresponding to the edge (#11). The processing by the edge extraction portion 104b is performed on all pixels of the extraction image 8 (#12 and #13).

Figure 8:
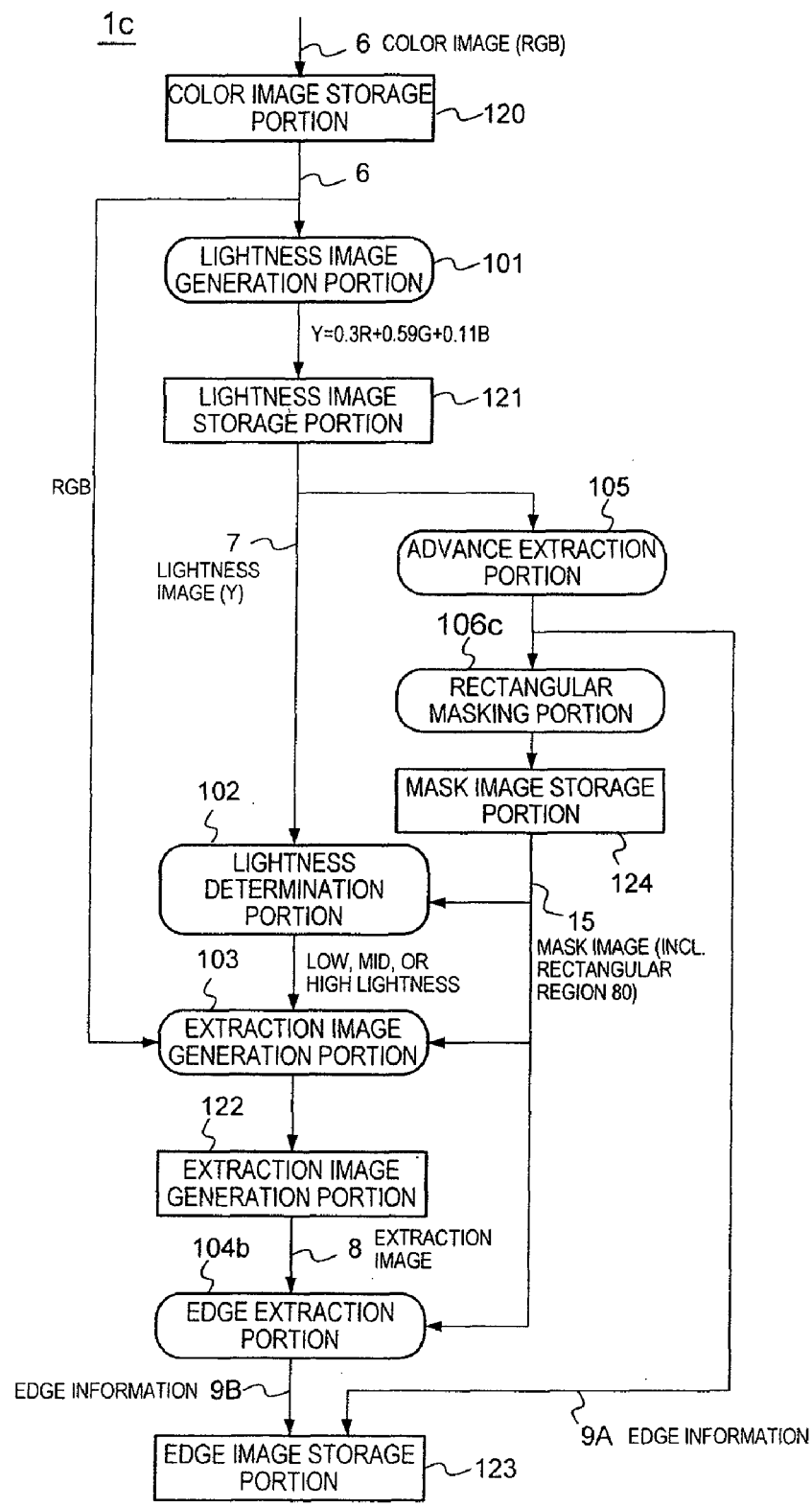
FIG. 8 is a diagram illustrating a functional configuration of an image processing apparatus according to a third embodiment.

An image processing apparatus 1c exemplified in FIG. 8 is provided with a rectangular masking portion 106c instead of the masking portion 106 included in the image processing apparatus 1b described earlier and illustrated in FIG. 6. Other configuration of the image processing apparatus 1c is the same as that of the image processing apparatus 1b.

Figure 9:
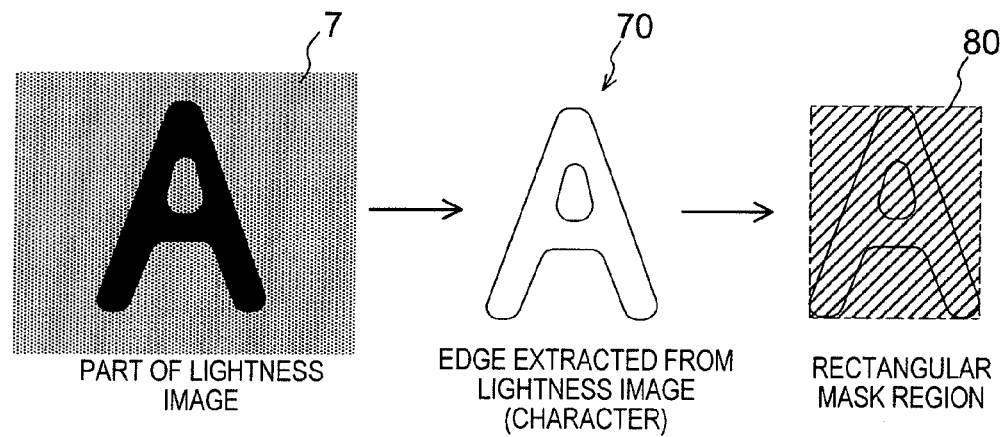
FIG. 9 is a diagram illustrating an example of setting a rectangular mask region.

The rectangular masking portion 106c sets a rectangular region encompassing a continuous edge that has been extracted by the advance extraction portion 105 as the mask region. For example, when an edge 70 representing an outer edge of one character is extracted from the lightness image 7 as illustrated in FIG. 9, a minimum-sized rectangular region 80 encompassing the edge 70 is set as the mask region. The rectangular region 80, however, may not necessarily be the minimum size, but may be a rectangular form having each side longer than a side of the minimum size by a size of a few pixels. In addition, although the rectangular shape encompassing one character is illustrated, it is also possible to set a rectangular region encompassing a plurality of characters as the mask region if a text region such as a line or column filled with a plurality of characters is to be detected by a known text detection method. Here, the rectangular region 80 is a region having an outer edge thereof aligned in an orientation direction of pixels.

The mask image storage portion 124 stores therein the mask image 15 including the rectangular region 80 that is set as the mask region. Alternatively, the mask image storage portion 124 may store apex positions of the rectangular portion 80 instead of the mask image 15 (e.g., coordinates of two apexes, left-upper and right-lower apexes).

Figure 10:
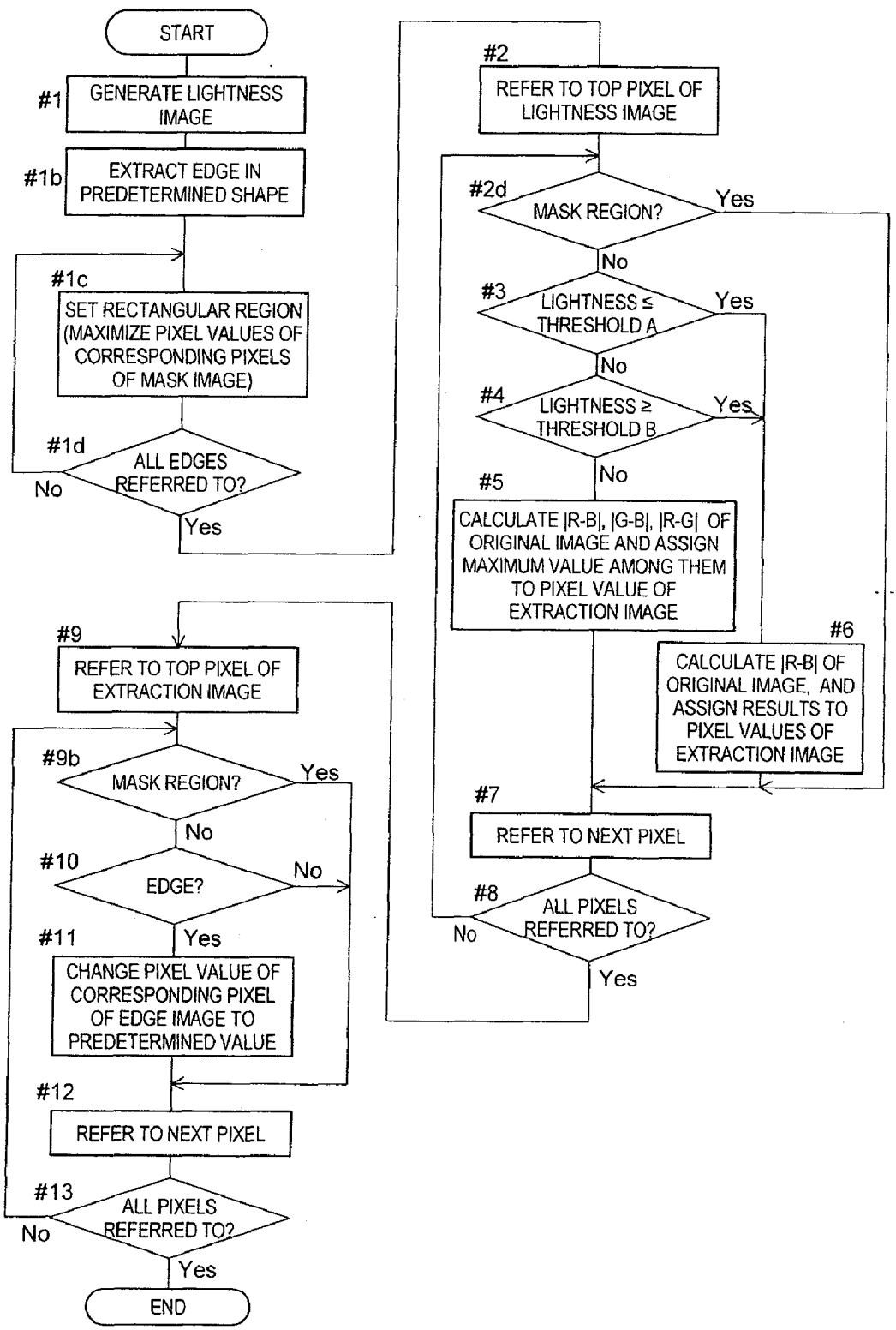
FIG. 10 is a flowchart illustrating the operation of the image processing apparatus according to the third embodiment.

FIG. 10 illustrates outlined operation of the image processing apparatus 1c.

The lightness image generation portion 101 generates the lightness image 7 (#1), and the advance extraction portion 105 sequentially checks each pixel of the lightness image 7 from a first pixel and determines whether the pixel corresponds to an edge, and extracts an edge of a predetermined shape that satisfies a predetermined condition such as the one represented by an outer edge of a character (#1b). The rectangular masking portion 106c sets, for the extracted edge, a rectangular mask region and sets the pixel values of corresponding pixels of the mask image 15 to the maximum value of "255" which serves as a masking value (#1c). If the mask region is identified by an apex of the rectangular region 80, then the coordinate of the apex is recorded. The rectangular mask regions are set for all edges that have been extracted by the advance extraction portion 105 (#1d).

Processing by the lightness determination portion 102 and the extraction image generation portion 103 is performed substantially on regions excluding the mask region. Specifically, the image processing apparatus 1c checks pixels of the lightness image 7 from a first pixel thereof and determines whether or not the checked pixel corresponds to the mask region based on the mask image 15 or the recorded coordinate of the apex (#2 and #2d). The lightness determination portion 102 determines the lightness of only those pixels that do not correspond to the mask region (#3 and #4), and the extraction image generation portion 103 decides the pixel value of the extraction image 8 (#5 and #6). The pixel values of the extraction image 8 corresponding to the mask region remain unchanged at the initial value.

Then, the edge extraction portion 104b generates the edge image 9 in the same manner as applied to the example described previously. The edge extraction portion 104b checks each pixel sequentially from a first pixel of the extraction image 8 and determines whether or not the pixel corresponds to the mask region (#9 and #9b), and determines whether or not only those pixels that do not correspond to the mask region correspond to the edge (#10). If a target pixel of the extraction image 8 corresponds to the edge, the edge extraction portion 104b changes the pixel value of the pixel corresponding to the edge image 9 from the initial value to a predetermined value which indicates that the pixel corresponds to the edge (#11). The edge extraction portion 104 processes all pixels of the extraction image 8 (#12 and #13).

In the embodiments described above, the threshold values A and B that divide the lightness region may be arbitrarily selected. Since the edge extraction from the low and high lightness regions is relatively simpler than the medium lightness region, wider low and high lightness regions are advantageous for reducing a processing load by software. For example, the load is effectively reduced for a color image having 50% or more pixels falling under the low or high lightness region. Considering a possibility that the extraction tends to fail from the medium lightness region, it is preferable that the threshold A be set as large as possible, and, at the same time, the threshold B be set as small as possible within a range that secures desired extraction accuracy.

Specifically, the thresholds A and B may be set in a manner described below.

In the case where a difference value |R−B| of a pixel whose lightness corresponds to the low or high lightness region is set as a pixel value of a pixel of the extraction image 8, the darkest color among colors that satisfy the condition of R=B on a color pallet that is popularly used is focused for determining the threshold A. Among colors used in generally software for creating an office document, the color that satisfies the above-mentioned condition is dark green whose values are [R: 0, G: 51, B: 0]. The threshold A is set so that the lightness of the dark green falls under the medium lightness region. The lightest color among colors that satisfy the same condition of R=B is focused for determining the threshold B. Among colors used in general software for creating an office document, the colors that satisfy the above-mentioned condition are light green whose values are [R: 204, G: 255, B: 204] and light pink whose values are [R: 255, G: 204, B: 255]. The threshold B is set so that the lightness of such colors falls under the medium lightness region. For example, when the previously discussed equation, "Y=0.3R+0.59G+0.11B" is applied for calculating the lightness, the threshold A becomes 30, and the threshold B becomes 235.

In the case where a difference value |G−B| of a pixel corresponding to the low or high lightness region is set as a pixel value of a pixel of the extraction image 8, colors that satisfy the condition of G=B on a color pallet that is popularly used are focused. The threshold A is set so that the lightness of light cyan, having values of [R: 204, G: 255, B: 255] and the darkest among the focused colors, falls under the medium lightness region, and the threshold B is set so that the lightness of dark red, having values of [R: 128, G: 0, B: 0] and the lightest among the focused colors, falls under the medium lightness region. In this case, when the previously discussed equation, "Y=0.3R+0.59G+0.11B" is applied for calculating the lightness, the threshold A becomes 38, and threshold B becomes 240.

When the specific examples of the thresholds A (30, 38) and B (235, 240) in the two cases discussed above are reviewed, the low lightness region defined by the threshold A is wider when the difference value is |G−B|, whereas the high lightness region defined by the threshold B is wider when the difference value is |R−B|. In a general business document, the pixels having lighter colors overwhelm the pixels having darker colors. For this reason, it is advantageous in reducing the load in edge extraction processing to set the difference value |R−B| as the pixel value of a pixel of the extraction image 8 rather than the difference value |G−B|.

According to one aspect of the present invention, it is possible to prevent the edge extraction from being incomplete if it is based only on lightness and perform the extraction of an edge included in a color image faster than the case where edge extraction is performed based on each color component from the colors R, G, and B.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing method for extracting an edge from a color image comprising pixels each of which expressed by color component values of three R, G, and B colors, comprising:
    calculating a lightness value of each of the pixels based on the color component values of three colors corresponding to said each of the pixels;
    determining which one of the low, medium, and high lightness regions defined by dividing a predetermined lightness range into three the lightness value thus calculated belongs to;
    generating an extraction image comprising pixels corresponding to said each of the pixels of the color image;
        wherein, for a pixel of which the lightness value belongs to the medium lightness region, a pixel value is determined based on the color component values of three colors,
        wherein, for a pixel of which the lightness value belongs to the low lightness region, a pixel value is determined based on the color component values excluding at least one of the color component values of three colors; and
        wherein, for a pixel of which the lightness value belongs to the high lightness region, a pixel value is determined based on the color component values of two colors of the color component values of three colors, or, based on the lightness value and the color component value of B; and
    extracting an edge based on the pixel value of the extraction image thus generated.

2. The image processing method according to claim 1, further comprising
    after extracting the edge from the color image based on the calculated lightness value, performing, on the pixels that do not correspond to the edge that has been extracted based on the calculated lightness value, determination as to which one of the low, medium, and high lightness regions the lightness value of the first pixel belongs to, determination of the pixel values of the extraction image, and extraction of an edge based on the pixel value of the extraction image.

3. The image processing method according to claim 1, wherein, when the extraction image is generated,
    for a pixel of which the lightness value belongs to the low lightness region, one of a difference value between color component values of R and B, a difference value between color component values of G and B, and a color component value of B is assigned to a pixel value;
    for a pixel of which the lightness value belongs to the medium lightness region, a maximum value among a difference value between color component values of R and B, a difference value between color component values of G and B, and a difference value between color component values of R and G is assigned to a pixel value; and
    for a pixel of which the lightness value belongs to the high lightness region, one of a difference value between color component values of R and B, a difference value between color component values of G and B, and a difference value between the lightness value and a color component value of B is assigned to a pixel value.

4. An image processing apparatus for extracting an edge from a color image comprising first pixels each of which expressed by color component values of three R, G, and B colors, comprising:
    a memory that stores therein a lightness value of each of the pixels calculated based on the color component values of three colors corresponding to said each of the pixels;
    a determination portion that determines which one of low, medium, and high lightness regions the lightness value thus stored in the memory belongs to, the low, medium, and high lightness regions being defined by dividing a predetermined lightness range into three;
    an image generation portion that generates an extraction image comprising pixels corresponding to said each of the first pixels of the color image,
        the image generation portion determining, for a pixel of which the lightness value belongs to the medium lightness region, a pixel value based on the color component values of three colors determining, for a pixel of which the lightness value belongs to the low lightness region, a pixel value based on the color component values of said given first pixel excluding at least one of the color component values of three colors, and determining, for a pixel of which the lightness value belongs to the high lightness region, a pixel value based on the color component values of two colors of the color component values of three colors, or, based on the lightness value and the color component value of B; and an extraction portion that extracts an edge based on the pixel value of the extraction image thus generated by the image generation portion.

5. The image processing apparatus according to claim 4, further comprising:

an advance extraction portion that extracts an edge in the color image based on the lightness value, stored in the memory, of said each of the first pixels of the color image; and a masking portion that sets, as a mask region, a region of a mask image comprising pixels corresponding to said each of the first pixels of the color image, the region corresponding to the edge extracted by the advance extraction portion, wherein the determination portion determines which one of the low, medium, and high lightness regions a lightness value of a pixel in a region of the color image excluding a region that corresponds to the mask region belongs to, and the extraction portion extracts an edge from a region of the extraction image excluding a region that corresponds to the mask region.

6. The image processing apparatus according to claim 5, wherein the masking portion sets, as the mask region, a rectangular region that encompasses a continuous edge extracted by the advance extraction portion.

7. A non-transitory computer-readable storage medium storing thereon a computer program executed by a computer provided in an image processing apparatus that extracts an edge from a color image comprising first pixels each of which expressed by color component values of three R, G, and B colors, the computer program, when read and executed by the computer, causing the image processing apparatus to implement:

a calculation portion that calculates a lightness value of each of the first pixels based on the color component values of three colors corresponding to said each of the first pixels;

a determination portion that determines which one of low, medium, and high lightness regions defined by dividing a predetermined lightness range into three the lightness value thus calculated belongs to;

an image generation portion that generates an extraction image comprising pixels corresponding to said each of the first pixels of the color image, the image generation portion determining, for a pixel of which the lightness value belongs to the low lightness region, a pixel value based on the color component values excluding at least one of the color component values of three colors, determining, for a pixel of which the lightness value belongs to the medium lightness region, a pixel value based on the color component values of three colors, and determining, for a pixel of which the lightness value belongs to the high lightness region, a pixel value based on the color component values of two colors of the color component values of three colors or, based on the lightness value and the color component value of B; and an extraction portion that extracts an edge based on the pixel value of the extraction image generated by the image generation portion.

8. The non-transitory computer-readable storage medium according to claim 7, further implementing:

an advance extraction portion that extracts an edge in the color image based on the lightness value of said each of the pixels of the color image, the lightness value having been calculated by the calculation portion; and a masking portion that sets, as a mask region, a rectangular region encompassing a continuous edge extracted by the advance extraction portion, the rectangular region being a region in the extracted image, wherein the determination portion determines which one of the low, medium, and high lightness regions, a pixel in a region of the color image excluding a region that corresponds to the mask region belongs to, and the extraction portion extracts an edge from a region of the extraction image excluding a region that corresponds to the mask region.

9. The image processing apparatus according to claim 4, wherein, when the extraction image is generated, the image generation portion assigns, for a pixel of which the lightness value belongs to the low lightness region, one of a difference value between color component values of R and B, a difference value between color component values of G and B, and a color component value of B to a pixel value;

for a pixel of which the lightness value belongs to the medium lightness region, a maximum value among a difference value between color component values of R and B, a difference value between color component values of G and B, and a difference value between color component values of R and G to a pixel value; and for a pixel of which the lightness value belongs to the high lightness region, one of a difference value between color component values of R and B, a difference value between color component values of G and B, and a difference value between the lightness value and a color component value of B to a pixel value.

10. The non-transitory computer-readable storage medium according to claim 7,

Wherein when the extraction image is generated, the image generation portion assigns, for a pixel of which the lightness value belongs to the low lightness region, one of a difference value between color component values of R and B, a difference value between color component values of G and B, and a color component value of B to a pixel value;

for a pixel of which the lightness value belongs to the medium lightness region, a maximum value among a difference value between color component values of R and B, a difference value between color component values of G and B, and a difference value between color component values of R and G to a pixel value; and or a pixel of which the lightness value belongs to the high lightness region, one of a difference value between color component values of R and B, a difference value between color component values of G and B, and a difference value between the lightness value and a color component value of B to a pixel value.

* * * * *